(12) United States Patent
Banerjee (10) Patent No.: US 10,000,427 B2
(45) Date of Patent: Jun. 19, 2018

(54) PHOSPHATE SOLUBILIZING RHIZOBACTERIA BACILLUS FIRMUS AS BIOFERTILIZER TO INCREASE CANOLA YIELD

(71) Applicant: XITEBIO TECHNOLOGIES INC., Winnipeg (CA)

(72) Inventor: Manas Ranjan Banerjee, Winnipeg (CA)

(73) Assignee: XITEBIO TECHNOLOGIES INC., Winnipeg, Manitoba (CA)

( * ) Notice: Subject to any disclaimer, the term of this patent is extended or adjusted under 35 U.S.C. 154(b) by 0 days. days.

(21) Appl. No.: 15/496,804

(22) Filed: Apr. 25, 2017

(65) Prior Publication Data

US 2017/0297968 A1    Oct. 19, 2017

Related U.S. Application Data

(63) Continuation-in-part of application No. 14/425,654, filed as application No. PCT/CA2013/050805 on Oct. 24, 2013, now abandoned.

(60) Provisional application No. 61/731,706, filed on Nov. 30, 2012.

(51) Int. Cl.
  *C12R 1/07*     (2006.01)
  *C05F 11/08*    (2006.01)
  *C05B 17/00*    (2006.01)

(52) U.S. Cl.
  CPC .............. *C05F 11/08* (2013.01); *C05B 17/00* (2013.01)

(58) Field of Classification Search
  CPC ........................................................ C12R 1/07
  See application file for complete search history.

(56) References Cited

U.S. PATENT DOCUMENTS

2011/0110906 A1* 5/2011 Andersch ............... A01N 63/00
                                                                424/93.46

OTHER PUBLICATIONS

Datta et al., Plant and Soil, 69, 365-373, 1982.*

* cited by examiner

*Primary Examiner* — Ruth A Davis
(74) *Attorney, Agent, or Firm* — Michael R. Williams; Ryan W. Dupuis; Ade & Company Inc.

(57) ABSTRACT

A biologically pure phosphate solubilizing plant growth promoting rhizobacteria (PGPR) XSB375 was isolated from canola rhizosphere and identified as *Bacillus firmus* is provided herein. The PGPR is capable to solubilize phosphate that enhance plant available phosphorous. The PGPR XSB375 enhances seed germination, early emergence, plant vigor, root and shoot growth, and higher crop yield. This increased crop growth, development and yield is attributed from not only the greater phosphate solubilization making more available phosphorus to plant but also making other essential plant nutrients more available to the plant and the like. The application of this phosphate solubilizing PGPR can be done as liquid suspension or solid materials using onto soil, potting mix, seeds, seed pieces, seedlings, foliage, carrier materials, roots and planting soil.

18 Claims, 7 Drawing Sheets

Figure 1. Rhizobacteria XSB375 showing phosphate solubilizing activity on agar plate containing insoluble phosphate Figure 2. Percentage (%) of germinated canola seed in soil Figure 3. Canola seed inoculated with rhizobacteria XSB375 showing effect on fine root hair growth Figure 5. Bacterial inoculation effect on canola root & hypocotyl length at 7 days Figure 6. Viability of rhizobacteria XSB375 in liquid suspension

PHOSPHATE SOLUBILIZING RHIZOBACTERIA BACILLUS FIRMUS AS BIOFERTILIZER TO INCREASE CANOLA YIELD

PRIOR APPLICATION INFORMATION

The instant application is a continuation-in-part of U.S. patent application Ser. No. 14/425,654, filed Mar. 4, 2015 which is a 371 of PCT Application CA2013/050805, filed Oct. 24, 2013, now abandoned, which claimed the benefit of U.S. Provisional Patent Application Ser. No. 61/731,706, filed Nov. 30, 2012, now abandoned.

FIELD OF THE INVENTION

The present invention relates generally to the field of bio fertilization and plant inoculants. More specifically, the present invention relates to application of naturally-occurring phosphate solubilizing rhizobacteria to increase canola growth, development and yield.

BACKGROUND OF THE INVENTION

Phosphorus (P) is an essential nutrient for growth and development of plants, constituting up to 0.2% dry weight. Phosphorus is typically insoluble or poorly soluble in soils. Although the average P content of soils is about 0.05% (w/w), only 0.1% of the total P exists in plant accessible form (Illmer et al., 1995, *Soil Biology and Biochemistry* 27: 260-270). As a result, large amounts of soluble forms of P fertilizers are applied to meet the crop requirements to attain maximum production. Crops need more P than is dissolved in the soil solution to grow economically, therefore this P 'pool' must be replenished many times during the growing season. The ability of a soil to maintain adequate levels in the solution phase is the key to the plant available P status of a soil. However, the applied soluble forms of P fertilizers are easily precipitated into insoluble forms such as tricalcium phosphate [$Ca_3(PO_4)_2$], ferric phosphate ($FePO_4$), and aluminum phosphate ($AlPO_4$) (Achal et al., 2007, *Soil Biology and Biochemistry* 39: 695-699). Inorganic P is negatively charged in most soils. Because of its particular chemistry, P reacts readily with positively charged calcium (Ca), iron (Fe) and aluminum (Al) ions to form relatively insoluble substances. When this occurs, the P is considered "fixed" or "tied up". Thus, P is fixed in the soil by locking itself and rendered unavailable to plants. This is also the case in western Canada as the majority of western Canadian soils are neutral to alkaline pH and calcium phosphate minerals are the dominant inorganic precipitates. It has been found that approximately 75-90% of applied P fertilizer is precipitated by Ca, Fe and Al cations. These insoluble forms are not efficiently taken up by the plants and thus lead to an excess application of P fertilizer to crop fields (Khan et al., 2007, *Agronomy and Sustainable Development* 27: 29-43). The application of P fertilizer initially adds to the levels of available P already present in soil. A portion of applied P is used in the year of application (10-30%), and the remaining unused P reverts to forms of soil P which become increasingly less available to the plant.

As per Goldstein et al. (1993, *Bio/Technology* 11: 1250-1254) the unavailable phosphates built up in soils are adequate to sustain maximum crop yields globally for about 100 years. Moreover, excess P application also enhances the potential for P loss to surface waters through overland or subsurface flow that accelerates freshwater eutrophication. This is the process in bodies of water of stimulating algal growth which ultimately die and decay in the water, and deplete available oxygen. The reduced oxygen levels ultimately result in reduced higher-order aquatic plant and animal populations. The P that can contribute to the enrichment of water bodies, and hence lead to eutrophication, is a combination of P that is attached to soil particles less than 0.45 µm in size that are transported during soil movement. The risk of P losses to the environment through surface runoff is greatest on sloping lands, and where fertilizer is surface applied and then followed by rainfall or irrigation. Manitoba fresh water lakes are one such examples of eutrophication. Eutrophication of most fresh water around the world is accelerated by P inputs and therefore, P is often the limiting element, and its control is of prime importance in reducing the accelerated eutrophication of fresh waters (USDA, 2003 in *Agricultural phosphorus and eutrophication, Second Edition*, (Sharpley, Daniel, Sims, Lemunyon, Stevens and Parry, eds), ARS-149, pp 38).

Phosphorus is vital for stable food production systems and for buffering against climate change impacts on soil. This is important for both crop and livestock production (AIC, 2010, *Agriculture Institute of Canada Notes*, June 3, issue 22). It is not always realized that phosphate is a scarce raw material, probably the most critical one. High quality P reserves are diminishing and the cost of fertilizers is escalating rapidly. Global reserves of phosphate (with >20% $P_2O_5$ content) seem to be in the range of 10000 million tonnes. With a future annual consumption of 40-50 million tonnes of $P_2O_5$ these reserves would last less than 200 years (FAO, 2006, *FAO (Food and Agriculture Organization) Fertilizer and Plant Nutrition Bulletin* 16, pp 348). Therefore, use of phosphate fertilizers need to be as judicious as possible and nutrient use efficiency of the phosphate fertilizers are required to be improved considerably. This is a particularly relevant and important topic in the light of the increasing global population as well.

Phosphorus occurs in soil in both organic and inorganic forms that differ greatly in terms of their solubility and mobility. Phosphorus applied through mineral fertilizers is in inorganic forms of varying solubility. Even at optimal rates, the use of mineral fertilizers and organic manures can lead to a buildup of soil P over time. Plants take up inorganic phosphate in two soluble forms: monobasic ($H_2PO_4^-$) and dibasic ($HPO4^{2-}$) ions (Vessey, 2003, *Plant and Soil* 255: 571-586; Banerjee et al., 2006 in *Hand Book of Microbial Biofertilizers* (Rai, ed) pp 137-181). Some soil microorganisms are able to solubilize these insoluble P forms through the process of organic acid production, chelation, ion exchange reactions and polymeric substances formation, and make P available to plants (Vessey, 2003; Delvasto et al., 2006, *Indian J. Mar. Sci.* 29: 48-51; Chang and Yang, 2009, *Bioresour. Technol.* 100: 1648-1658). Seed or soil inoculations with phosphate solubilizing microbes have largely been used to improve crop growth and production by solubilization of fixed and applied phosphates (Nautiyal et al., 2000, *FEMS Microbiology Letters* 182: 291-296; Adesemoye and Kloepper, 2009, *Applied Microbiology and Biotechnology* 85: 1-12). Phosphate solubilizing bacteria play a role in P nutrition by enhancing its availability to plants through release from inorganic and organic soil P pools by solubilization and mineralization. The principal mechanism in soil for mineral phosphate solubilization is the lowering of soil pH by microbial production of organic acids and mineralization of organic P by acid phosphatase enzyme (Sharma et al., 2011, *J. Microbiol. Biotech. Res.* 1(2): 90-95). The existence of microorganisms able to solubilize various forms of phosphates has been reported frequently elsewhere (e.g., Khan et al., 2009, *J. Agric. Biol. Sci.* 1(1): 48-58; Chakkaravarthy et al., 2010, *J. Biol. Sci.* 10(6): 531-535) but the success of utilizing the P-solubilizing plant growth promoting rhizobacteria (PGPR) as a commercial bioinoculant in different agroclimatic conditions in Canada (as well as USA) is yet to be determined appropriately. The PGPR and rhizosphere bacteria are free-living soil organisms that benefit plant growth by different mechanisms (Glick, 1995, *Canadian Journal of Microbiology* 41: 109-117). The ability of microorganisms to solubilize phosphorus is considered to be one of the most important traits associated with plant P nutrition (Chen et al., 2006, *Applied Soil Ecology* 34: 33-41). Hence, a biological seed treatment or bioinoculant with suitable formulation with naturally occurring P-solubilizing PGPR has tremendous potential to enhance production in prairie agronomic crops like canola (*Brassica napus* L.) with lower input cost (e.g., Banerjee and Yesmin, 2000, *Agronomy Abstracts*, Annual Meeting, Soil Science Society of America, pp 257). Canola is a major cash crop of the Canadian prairies (approx. 20 million acres) and any improvement in their yield potential would be substantial to the Canadian farmers as well as the economy. Thus, enhancing the production of canola with consistent performing phosphate solubilizing PGPR bioinoculant could be huge. In general, biological fertilization or biofertilizer is based on the use of natural inputs like microorganisms (e.g., bacteria, fungi) and are used to improve soil nutrient availability, produce growth stimulant for plant, improve soil stability, recycle nutrients, promote mycorrhiza symbiosis and develop bioremediation process in soil (Carvajal-Munoz and Carmona-Garcia, 2012, *Livestock Research for Rural Development* 24(3): pp 1-7). Hence, the naturally-occurring phosphate solubilizing PGPR could have a real potential to be used as a canola biofertilizer to enhance the canola production in western Canada and elsewhere.

U.S. Pat. No. 5,503,652 teaches the isolation of strains that are capable of promoting root elongation in plants.

U.S. Pat. No. 5,503,651 teaches the use of PGPR strains in promoting growth of cereals, oil seeds and maize based on the chemotactic and root-colonizing capabilities of the strains.

U.S. Pat. No. 6,406,690B1 teaches the use of *Bacillus firmus* strain CNCN I-1582 and *Bacillus cereus* strain CNCN I-1562 to control plant pathogenic nematodes.

US Patent 20060083725A1 teaches the use of a *Bacillus firmus* strain to suppress bacterial and fungal disease in roots and tubers.

CN Patent 1355292-A and 1142268-C teach the use of *Bacillus firmus* strain BC9 KCCM 10865P that are highly able to remove nasty odors and heavy metals of livestock wastewater and food waste.

U.S. Pat. No. 5,244,658 teaches isolation of *Pseudomonas cepacia* strain which controls root rot caused by *Aphanomyces* fungus in pea.

U.S. Pat. No. 4,849,008 teaches applying *Pseudomonas* to the roots, plants, seeds, seed pieces or soil of root crops for enhancing the yield of root crops.

U.S. Pat. No. 6,194,193 teaches the use of a formulation for enhancing plant growth which comprises a mixture of *Bacillus* and *Paenbacillus* strains which produce phytohormones.

U.S. Pat. No. 5,589,381 teaches the isolation of a biocontrol element comprising a *Bacillus licheniformis* strain which controls *Fusarium* seedling blight in corn.

U.S. Pat. No. 6,232,270 teaches the treatment of plants by a composition containing agriculturally active ingredient and enhancer additive containing a pure culture of bacteria selected from genus *Bacillus* or soil bacteria, and the added culture may be added as cells, spores or suspensions.

DE Patent application 20110257009 teaches a method curatively controlling phytopathogenic fungi of plants using a composition of dithiino-tetracarboximide and agriculturally beneficial biological control agent.

CA Patent 2720739 teaches an agriculturally stable aqueous formulation comprising of bacterial spores, fungal spores and an organic solvent.

U.S. Pat. No. 8,008,545 teaches a method of production of fine chemicals like amino acids, vitamins, carbohydrates, fatty acids and carotenoids in a microorganism, plant, plant cell and plant tissue.

The basic requirement of profitable crop production is to produce an agronomic yield that can maximize net returns. Even the highest yield would not be of interest if its production were not cost-effective. Most farmers would like to maximize the net gains from whatever investment they can make in inputs. However, they also realize that top profits are possible only with optimal investment along with the correct decisions about the proper and innovative inputs (like P-solubilizing bioinoculant).

There has been much research conducted on the use of organisms to increase P availability in soils by "unlocking" P present in otherwise sparingly soluble forms. These microbes help in the solubilization of P from phosphate rock and other insoluble forms of soil P, and in the process decreasing their particle size, reducing it to nearly amorphous forms. Datta et al. (1982, *Plant and Soil* 69: 365-373) reported of a phytohormone producing phosphate solubilizing *Bacillus firmus* in augmenting paddy yield in acid soils of Nagaland. deFreitas et al. (1997, *Biology and Fertility of Soils* 24: 358-364) showed using phosphate solubilizing bacteria enhances the growth and yield of canola but P uptake in canola was not augmented. In addition to bacteria, the fungus *Penicillium bilaii* has been shown to increase P availability from native soils and phosphate rock sources in calcareous soils (Kucey, 1983, *Canadian Journal of Soil Science* 63: 671-678; Kucey and Leggett, 1989, *Canadian Journal of Soil Science* 69: 425-432). In fact, there is only one product in North America that contains a single action fungal P-solubilizer making it difficult for the inoculant to cope with the environmental stresses and be competitive. Bacteria are more effective in P solubilisation than fungi (Alam et al., 2002, *Intl. J. Agric. Biol.* 4: 454-458). Among the whole microbial population in soil, P solubilizing bacteria constitute 1-50%, while P solubilizing fungi are only 0.1-0.5% in P solubilisation potential (Chen et al., 2006, *Appl. Soil Ecol.* 34: 33-41). In addition, fungal inoculants are generally less competitive compared to bacterial inoculants and fungal spores are also not easy to mass-produce. However, in some other countries (such as India, Taiwan) the P-solubilizing bacteria are becoming popular (Zaidi et al., 2009, *Acta Microbio Immunol Hung* 56 (3): 263-284; Chang and Yang, 2009, *Bioresour Technol* 100 (4): 1648-1658; Ekin, 2010, *African Journal of Biotechnology* 9 (25): 3794-3800), ranking next in importance to the nitrogen-fixing *Rhizobium* inoculants, and usually more than one type of organism is used while preparing the P-solubilizing bio fertilizer. The present invention introduces not only pure culture but also a consortia based approach with multiple strains of P-solubilizing bacteria. It shows the feasibility of potential use of mixed bacteria to form synergistic consortia and will create greater competitive ability to perform consistently under different growing conditions (Yesmin and Banerjee, 2001, in *Proceedings of Saskatchewan Soils and Crops Workshop* 2001, pp 314-319).

Although the pure culture or consortia culture inoculant may divulge enormous possibilities for canola, for a biological inoculant to be commercially effective, it must be mass-produced efficiently and formulated into a cost-effective, uniform, and readily applicable form (Walter and Paau, 1997 in *Soil Microbial Ecology: Applications in Agricultural and Environmental Management*, Metting, Jr., (ed.), pp. 579-594). Much of the studies have done for identifying the possible microbiological active, yet little has been investigated on these particular aspects. The benefit of microbial inoculation for greater crop production is significantly impacted by the number of live cells introduced into soil (Duquenne et al., 1999, *FEMS Microbiology Ecology* 29: 331-339). Furthermore, biological activity of microbes may also decline rapidly with handling and storage procedure. Daza et al. (2000, *Soil Biology and Biochemistry*, 32: 567-572) evaluated a peat and a perlite-based inoculant, and showed that sucrose adhesive along with the perlite carrier gave better viability of bacteria on seeds. A key limitation to successfully commercializing beneficial microorganisms is overcoming difficulties in creating a viable, cost-effective, and user-friendly final product (Xavier et al, 2004 in *Crop Management Network, Symposium Proceedings Great Plains Inoculant Forum*, Saskatoon, Saskatchewan, pp. 1-6). Thus, it is critical to ascertain the length of bacterial survivability once the bacterial seed treatment is done and to attain the required level of bacterial population for the inoculant to be efficacious.

In most Canadian canola acres, treated seeds are regularly used as a critical component to control plant diseases. These fungicides/insecticides (e.g. Helix Xtra, Prosper FX, etc.) formulated as a suspension are used as seed treatments to control pre-emergence damping off, seed decay and other soil-borne diseases. It is anticipated that the bacterial cultures may not be alive with these pesticides at the recommended doses due to their high toxicity towards the bacteria (Yesmin and Banerjee, 2000, Agronomy Abstracts, Annual Meeting, Soil Science Society of America, pp 257; Yesmin and Banerjee, 2001). Our innovative approach of P-solubilizing formulations will allow high survivability of introduced bacteria across various environmental constrains, thereby ensuring higher yield and greater productivity. This will also resolve issues related to seed treatment chemicals and will give the farmers flexibility in terms of choice of seed treatment chemicals. Ensuring high survivability of these bacteria will eventually ensure greater P availability and lower input of costly P fertilizer for the crops.

SUMMARY OF THE INVENTION

According to a first aspect of the invention, there is provided a bacterial culture consisting of: a biologically pure culture of XSB375, identified as *Bacillus firmus* (ATCC#PTA-120309).

According to a second aspect of the invention, there is provided a bacterial culture consisting of: a biologically pure culture of XSB375, identified as *Bacillus firmus*, (ATCC#PTA-120309) capable of phosphate solubilization.

According to a third aspect of the invention, there is provided a method of increasing plant growth and yield comprising:

inoculating a soil environment or potting mixture with a biologically pure culture of XSB375, identified as *Bacillus firmus* (ATCC#PTA-120309) and growing a plant in said soil environment or potting mixture.

According to a fourth aspect of the invention, there is provided a composition of matter comprising one phosphate solubilizing PGPR XSB375, identified as *Bacillus firmus* (ATCC#PTA-120309); and an agriculturally compatible carrier.

According to a fifth aspect of the invention, there is provided a composition of matter comprising one phosphate solubilizing PGPR XSB375, identified as *Bacillus firmus*, (ATCC#PTA-120309), in liquid suspension.

According to a sixth aspect of the invention, there is provided a seed coated with phosphate solubilizing PGPR XSB375, identified as *Bacillus firmus* (ATCC#PTA-120309).

According to a seventh aspect of the invention, there is provided a seed application or soil application or foliar application or post emergence application with a phosphate solubilizing PGPR XSB375, identified as *Bacillus firmus* (ATCC#PTA-120309).

According to a eighth aspect of the invention, there is provided a phosphate solubilizing PGPR XSB375, identified as *Bacillus firmus*, (ATCC#PTA-120309), to be utilized as a bio fertilizer.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Definitions

As used herein, "biologically pure" refers to a culture wherein virtually all of the cells present are of the selected strain.

As used herein, "inoculating" refers to introducing at least one bacterium into a medium, for example, a liquid medium, granular, peat powder, seed or a soil environment.

As used herein, "PGPR" or "plant growth promoting rhizobacteria" refers to plant beneficial isolates which inhabit the area surrounding plant roots.

As used herein, "soil environment" refers to the soil in which a plant is grown or is growing.

As used herein, "XSB375" refers to *Bacillus firmus*, deposited with ATCC under deposit number PTA-120309 on Apr. 23, 2013.

As will be appreciated by one of skill in the art, as used herein, "phosphate solubilizing PGPR" refers to beneficial bacterial cultures and isolates as well as cell extracts (extracellular or intracellular) or enzymes purified or genes isolated therefrom or DNA isolated therefrom derived therefrom capable of solubilizing phosphate, promoting phosphorus uptake, improving plant growth, development and/or improving plant yield.

Described herein is the isolation and identification of a phosphate solubilizing plant growth promoting rhizobacteria (PGPR): XSB375, identified as *Bacillus firmus* (ATCC#PTA-120309). The PGPR is capable to solubilize phosphate that enhance plant available phosphorous. The PGPR XSB375 enhances seed germination, early emergence, plant vigor, root and shoot growth, and crop yield. This increased crop yield is attributed not only from the greater phosphate solubilization, making more available phosphorus to plant but also making other essential plant nutrients more available to the plant. The application of this phosphate solubilizing PGPR can be done as liquid suspension or as solid materials applied to soil, potting mixture, seeds, seed pieces, seedlings, foliage, carrier materials, roots and planting soil. For example, the phosphate solubilizing PGPR may be coated onto a seed or seed piece, may be applied as a powder, may be applied as a liquid, may be applied foliar or as a suspension to a soil environment or may be mixed into a soil environment prior to use of the soil environment for planting.

Accordingly, in one aspect of the invention, there is provided a biologically pure bacterial culture of XSB375 (*Bacillus firmus*).

In another aspect of the invention, there is provided a method of increasing plant growth and/or yield comprising: inoculating with phosphate solubilizing PGPR XSB375 (*Bacillus firmus*) in soil environment or potting mixture; and growing a plant in said soil environment or potting mixture.

As discussed herein, in some embodiments, the soil environment or potting mixture includes phosphorus as a fertilizer. Specifically, the presence of PGPR XSB375 will result in greater and more efficient uptake of the phosphorus by the plants. That is, the application of XSB375 to the soil environment or potting mixture accomplishes at least one of the following: promote P-uptake in a plant; increase solubilisation of phosphate to $H_2PO_4^-$ within the soil environment; increase solubilisation of phosphate to $HPO_4^{2-}$ in the soil environment; alleviate a P-deficiency in a plant; alleviate P-deficiency in P-deficient soil fertilized with P fertilizer; promote uptake of macronutrients in a plant; and promote uptake of micronutrients in a plant. As will be appreciated by one of skill in the art, other benefits may also be observed and/or attained by application of PGPR XSB375 to the soil environment or potting mixture. Such additional benefits will be readily apparent to those of skill in the art.

As will be appreciated by one of skill in the art, the plant may be any suitable plant, for example, a plant which would benefit from increased P uptake, as discussed above.

In some embodiments, the plant is selected from the group consisting of oil seeds, legumes, non-legumes, cereals, root plants, vegetables, grasses, forage, turfs, fruits and flowering plants.

Alternatively, in other embodiments, the plant is selected from the group consisting of canola, soybean, sunflower, flax, hemp, wheat, barley, corn, millet, oat, pea, lentil, beans, peanut, alfalfa, clover, sugar beets, potatoes, carrots, cabbages, tomatoes, radishes, capsicum, cucumber, grasses, turf, cantaloupe, melon, fruits and flowers. The flowers may be selected from the group consisting of rose, chrysanthemum, lily and gerbera.

As discussed herein, XSB375 may be mixed into the soil environment or potting mixture. For example, XSB375 may be applied to the soil environment as a liquid suspension, for example, on a plant, on a post emergent plant, on a seed, on a seedling, or on carrier materials, as discussed herein.

In some embodiments, XSB375 is applied to the soil environment as a coating on a seed, as discussed below.

In other embodiments, there is provided a composition of matter comprising one phosphate solubilizing PGPR XSB375 (*Bacillus firmus*); and an agriculturally compatible carrier.

As will be appreciated by one of skill in the art, the carrier may be is a seed wherein XSB375 is coated onto the seed. The seed may be coated with peat or clay or mineral or vermiculite or polymer.

Alternatively, the carrier may be a liquid suspension, for example, an agriculturally compatible oil.

In other embodiments, the carrier may be a granular material, for example, peat or clay or perlite granules or mixture thereof.

As will be appreciated by one of skill in the art, XSB375 may be co-applied, either simultaneously or in serial with other suitable treatments applied to the soil environment to further improve plant growth. For example, XSB375 may be applied with another PGPR strain or with a compatible herbicide or fungicide or insecticide or seed treatment.

In the examples, the plant is canola which, as discussed above, is a high-phosphorus requiring crop. However, as will be apparent to one knowledgeable in the art, as discussed above, the phosphate solubilizing PGPR described herein may be used to promote growth of any suitable plant, for example cereals, for example corn, wheat, barley, oat and the like; oil seeds, for example canola, flax, hemp, sunflower and the like; legumes for example, soybean, pea, lentil and the like; root plants for example sugar beets, potatoes, radishes and the like; forages for example alfalfa, clover, grasses and the like; vegetables for example tomato, capsicum, cucumber and the like; turf for example bent grass, Kentucky blue grass and the like. That is, the phosphate solubilizing PGPR may enhance growth of any and all suitable plants having nutrient phosphorus requirement.

Similarly, in some embodiments of the invention, the phosphate solubilizing PGPR are used in a soil environment which has low levels of phosphorus or low levels of plant available phosphorus or highly locked phosphorus. It is of note that, as discussed above, the phosphate solubilizing PGPR can be used in any suitable soil conditions as the presence of the phosphate solubilizing PGPR will promote more efficient usage of phosphorus by plants grown in a soil environment and will thereby promote growth of plants grown in the soil environment. Thus, the above-described PGPR are capable of solubilizing phosphate; promoting P-uptake in plants; capable of alleviating a P-deficiency in plant; and capable of alleviating P-deficiency in P-deficient soil fertilized with P fertilizer.

In yet other embodiments, the phosphate solubilizing PGPR may be applied to a soil environment which has been or will be treated with a phosphorus-containing fertilizer, for example, rock phosphate. It is also of note that the phosphate solubilizing PGPR may promote uptake of phosphorus and other macro- and micro-nutrients within the soil environment whether provided by a fertilizer or not.

In other embodiments, the phosphate solubilizing PGPR are in combination with a carrier material. The carrier material may be a liquid, pellet, granular mass, powder, mineral or other similar element or may be a plant seed. Specifically, the phosphate solubilizing PGPR may be coated onto a seed using means known in the art. As way of example, the phosphate solubilizing PGPR may be mixed with peat, clay, perlite, vermiculite, mineral, polymer or agriculturally compatible oil.

In other embodiments, the phosphate solubilizing PGPR may be freeze-dried to a powder. Alternatively, an aqueous slurry of the phosphate solubilizing PGPR may be dried to a powder at a temperature which does not adversely affect bacterial viability. The microbial powder may be mixed with earth materials, minerals, clay, talc, peat or other agriculturally compatible materials. In yet other embodiments, a liquid suspension of the phosphate solubilizing PGPR may be used to coat the seeds or be applied to an absorbent material, for example, a granular material or applied as foliar spray on soil or plants.

As will be appreciated by one of skill in the art, survivability of applied bacterial culture is one of the critical factors for successful colonization of the rhizosphere and rhizoplane that results in plant growth, development and yield. For example, soil and landscape scale variability, nutrient status, and climatic conditions may affect bacterial survivability and crop yield. Hence, bacterial strain XSB375, identified as *Bacillus firmus*, is individually effective at promoting plant growth as described herein. In some embodiments, mixtures of XSB375 and any other PGPR may be used in the embodiments of the invention described herein. It is also of note that some combinations may work better under specific physio-chemical conditions of soil, such as soil pH, growth temperature, time of planting, and crop species. These combinations are within the scope of the invention and routine experimentation in the art.

As will be appreciated by one of skill in the art, the phosphate solubilizing PGPR may be applied with other suitable pesticidal agents, for example, herbicides, fungicides, insecticides, seed treatment chemicals or other PGPR and used in the embodiments described herein. That is, applying the phosphate solubilizing PGPR with other biopesticidal PGPR agents or pesticides may further enhance plant growth. Similarly, combining the above-described phosphate solubilizing PGPR with other plant growth-promoting PGPR may have a synergistic effect in promoting plant growth. It is of note that these combinations may be used in any of the above-described embodiments, for example, for coating seeds or liquid foliar application.

According to another aspect of the invention, there is provided a method for promoting or increasing or improving plant growth and/or plant yield comprising:

preparing a composition comprising a high density aliquot of plant growth promoting (PGPR) XSB375 *Bacillus firmus* strain deposited as ATCC#PTA-120309;

applying said composition to a soil environment in which seeds or seedlings have been or will be planted;

growing said seeds or seedlings into plants in said soil environment, said PGPR XSB375 colonizing said soil environment and secreting phosphatase in an amount sufficient to increase solubilisation of phosphate in the soil environment to $HPO_4^{2-}$ and $H_2PO_4^-$ for uptake by the plants such that growth of said plants is increased or improved; and harvesting said plants.

It is of note that the terms "increasing", "improving" and "promoting" as they pertain to "plant growth" and/or "plant yield" will be well understood by one of skill in the art. For example, promotion or improvement or increase of plant growth and/or plant yield may refer to taller plants, plants with more shoots, plants with greater biomass, plants yielding more product, plants yielding higher quality product, plants with more extensive root structure or greater root mass, healthier plants, faster growing plants, more resilient or resistant plants, or the like.

As used herein, "colonizing" refers to the fact that the bacteria are able to establish and grow within the soil environment (rhizosphere). Specifically, PGPR XSB375 is able to outcompete other naturally occurring bacteria present in the soil environment for nutrients. As such, PGPR XSB375 are able to grow to a sufficient density so that they colonize the soil environment, for example, the rhizosphere, so that sufficient phosphatase is secreted by the bacteria so that phosphate in the soil is solubilized, thereby increasing the amount of phosphate that is in plant-available form for uptake by the growing plants, thereby increasing and/or improving their growth and/or yield. Put another way, PGPR XSB375 is applied to the soil at a sufficient density, for example, at least about $1 \times 10^7$ colony forming units per ml, such that XSB375 is able to establish a bacterial colony within the rhizosphere, as discussed herein. As a result, XSB375 is able to outcompete other microbes within the rhizosphere for nutrients. Furthermore, as the high density aliquot that is applied to the soil has been prepared in growth media that maximizes the properties of XSB375 that are beneficial for plant growth, the benefit attained by plants grown in a soil environment comprising a colony for example a significant colony of XSB375 is maximized.

According to another aspect of the invention, there is provided a method for promoting or increasing or improving plant growth and/or plant yield comprising:

preparing a composition comprising a high density aliquot of plant growth promoting (PGPR) XSB375 *Bacillus firmus* strain deposited as ATCC#PTA-120309;

applying said composition to a soil environment in which seeds or seedlings have been or will be planted;

growing said seeds or seedlings into plants in said soil environment, said PGPR XSB375 outcompeting native bacteria in said soil environment and secreting phosphatase in an amount sufficient to increase solubilisation of phosphate in the soil environment to $HPO_4^{2-}$ and $H_2PO_4^-$ such that growth of said plants is increased or improved; and harvesting said plants.

For example, the PGPR XSB375 aliquot is able to grow to a sufficient density in the soil environment that the phosphatase secreted by the bacteria is sufficient to provide additional plant-available phosphate for the growing plants that their growth is substantially improved and/or increased.

That is, in some embodiments, the method comprises growing said seeds or seedlings into plants in said soil environment, the PGPR XSB375 aliquot is able to grow to a sufficient density in the soil environment that the phosphatase secreted by the bacteria is sufficient to increase solubilisation of phosphate in the soil environment to $HPO_4^{2-}$ and $H_2PO_4^-$ for the growing plants that their growth is substantially improved and/or increased.

In some embodiments, the composition is prepared by growing a biologically pure culture of PGPR XSB375 Bacillus firmus strain deposited as ATCC#PTA-120309 to a high density and aliquoting the culture.

As used herein, a high density aliquot refers to a composition comprising at least about $1 \times 10^7$ colony forming units per nil of PGPR XSB375.

That is, in some embodiments, the method comprises preparing a composition comprising at least $1 \times 10^7$ colony forming units per ml of PGPR XSB375 Bacillus firms strain deposited as ATCC#PTA-120309.

In some embodiments, the biologically pure culture is grown to a high density in a fermentor.

In some embodiments, the biologically pure culture is grown to a high density in a fermentor in growth media that increases or enhances the plant growth promoting properties of PGPR XSB375.

In some embodiments, the growth media is a tryptone-yeast extract nutrient broth.

In some embodiments, the growth media has a pH of between 6.7-7.9.

In some embodiments, the composition is prepared by growing a biologically pure culture of PGPR XSB375 Bacillus firmus strain deposited as ATCC#PTA-120309 in a fermentor containing a tryptone-yeast extract nutrient broth with a pH between 6.7-7.9 to a high density and aliquoting the culture.

In some embodiments, the culture is grown to a density of at least about $1 \times 10^7$ colony forming units per ml.

In other embodiments, the culture is grown to a density of at least about $1 \times 10^8$ colony forming units per ml.

In some embodiments, the composition is prepared by growing a biologically pure culture of PGPR XSB375 Bacillus firmus strain deposited as ATCC#PTA-120309 in a fermentor containing a tryptone-yeast extract nutrient broth with a pH between 6.7-7.9 to a density of at least about $1 \times 10^7$ colony forming units per ml and aliquoting the culture.

In some embodiments, the culture is grown in the fermentor to early stationary phase.

In some embodiments, the composition is prepared by growing a biologically pure culture of PGPR XSB375 Bacillus firmus strain deposited as ATCC#PTA-120309 in a fermentor containing a tryptone-yeast extract nutrient broth with a pH between 6.7-7.9 to a density of at least about $1 \times 10^7$ colony forming units per ml in early stationary phase and aliquoting the culture.

In some embodiments, the culture is aliquoted as liquid aliquots wherein each aliquot has a density of at least about $1 \times 10^8$ colony forming units per ml.

In some embodiments, the culture is aliquoted by pelleting the culture to produce a cell mass, drying the cell mass, freeze drying the cell mass to a powder and aliquoting the powder, wherein the powder has a density of at least about $1 \times 10^7$ colony forming units per gram.

As will be appreciated by one of skill in the art, the growth of the plants is increased or improved compared to plants of similar or the same variety grown under similar growth conditions except that the soil environment has not been supplemented with PGPR XSB375. It is of note that growth of the control plants for comparison does not necessarily need to be repeated each time. As will be apparent to one of skill in the art, plant growth may be increased or improved in several ways, for example but by no means limited to increased root length, increased number of roots, increased plant height or length, increased plant mass, improved root or plant health, increased plant yield and the like.

Bacillus firmus strain XSB375 is known to work in several ways to promote plant growth. For example, plant growth is promoted by: 1) solubilising immobile phosphates; 2) efficiently colonising the soil environment or rhizosphere comprising host plant roots and being a more competitive coloniser of the rhizospheric spaces by more competitively using nutrients and other resources; and 3) producing phytohormones to initiate earlier root development and stronger plant growth.

The identity of the strain XSB375 was confirmed through several methods. The taxonomically informative 16S rDNA sequence, 536 bp in length, was sequenced by MIDI Labs (Newark, Del., USA 2012), compared to the validated D15S2 Sherlock DNA library, and found to be 99.53% similar to the validated Bacillus firmus sequence. The 16S rDNA was also sequenced by the Department of Microbiology, University of Manitoba given the separate identifier to differentiate between the resulting sequences, compared to the NCBI database with a BLASTn search (Zhang et al. 2000), and identified as B. firmus being 99% identical with 100% sequence coverage and E-values of 0.0. Differential growth characteristics and morphology further substantiated this identification (Holt et al. 1994; Logan and De Vos 2009).

The strain XSB375 is a Bacillus firmus distinctly different from other Bacillus firmus and possesses the specific characteristics of P-solubilization and PGPR activities which are not present in many Bacillus strains. Furthermore, XSB375 is biologically different than the other Bacillus firmus (e.g., strain I-1582) as it doesn't possess nematicidal characteristics. For example, no phosphorous solubilisation activity is described for B. firmus I-1582 (Peleg and Feldman, 2002). Similarly, phosphorus solubilizing Bacillus firmus XSB375 has not been shown to have any nematicidal activity, consistent with the finding that nematicidal activity is not present throughout all strains of B. firmus (Wilson and Jackson 2013).

Indeed, strain XSB375 and strain I-1582 are very different: B. firmus XSB375 has a 16S rDNA sequence similarity of 99.53% to the B. firmus type specimen (MIDI Labs, USA 2012) while B. firmus I-1582 has a sequence similarity of 98.7% (Peleg and Feldman 2002).

Though the definite modes of action for strain I-1582 are not known, there are some confirmed modes of action among the diverse species of Bacillus studied for nematicidal activity. These mechanisms include interfering with nematode recognition of plant roots, production of toxins, nutrient competition, plant-growth promotion and induction of systemic resistance (reviewed in Tian et al. 2007b). Ammonia production can be an additional source of toxicity towards nematodes (Rodriguez-Kábana 1986). Most significant is the presence of highly conserved serine protease genes that can degrade nematode cuticles and egg sacs (Niu et al. 2006; Tian et al. 2006, 2007a). Some of these known mechanisms focus more on conferring resistance to the plant against nematodes rather than on directly targeting the nematodes themselves or providing any toxic effect against nematodes. As indicated above, ammonia production can be an additional source of toxicity towards nematodes (Rodríguez-Kábana 1986). Moreover, evidence indicates that most of the nematicidal effects from *B. firmus* I-1582 are due to direct nematicidal activity and Peleg and Feldman (2002) along with Keren-Zur et al. (2000) determined that the nematicidal activity of that particular strain is due to the destruction of nematode eggs, specifically through substantial proteolytic and collagenolytic activities (Peleg and Feldman 2002).

Suggested modes of action for direct effects on nematodes include high levels of protease and collagenolytic activities, production of small molecules, and ammonia production. There is evidence to support that strong protease activity and collagenolytic activity are responsible for these effects in those *B. firmus* strains that exhibit nematode suppressing properties, and have in fact been shown to exist in other species of *Bacillus*. *Bacillus laterosporus* produces extracellular proteases that target the nematode cuticle (Tian et al. 2007a) and *Bacillus nematocida* produces extracellular proteases that target nematode intestinal tissues (Niu et al. 2007; Niu et al. 2011). *Bacillus thuringiensis* has shown collagenolytic activity that targets nematode intestines (Peng et al. 2016). Therefore, protease and collagenolytic activities are the likely sources of nematode suppressing activity in those strains of *B. firmus* that have such properties.

Undoubtedly the production of high level of protease and collagenolytic related compounds provides evidence that *B. firmus* I-1582 degrades nematode egg sacs (Keren-Zur et al. 2000; Peleg and Feldman, 2002; Terefe et al. 2009; EFSA 2012; Lamovšek et al. 2013). Furthermore, the proteases effective against nematodes are highly conserved, not just within *Bacillus* but throughout nematophagous bacteria (Niu et al. 2006; Tian et al. 2007b). Taken together, this provides strong evidence for nematode suppressing activity in *B. firmus* to be the result of substantial protease activity, and this has recently been shown to be the case. *Bacillus firmus* DS-1 has been found to produce the protein sep1, a serine protease that degrades the structural proteins of nematode cuticles, and intestines in J2 nematodes. This extracellular protein showing nematicidal properties in *B. firmus* following whole genome sequencing and bioinformatic analytical methodologies is shown by Geng et al. (2016). This production of extracellular proteases is in agreement with the observations of Schrimsher et al. (2011) who showed that *Bacillus firmus* GB-126 cells and cell free extracts both have an effect on soybean cyst nematodes.

The nematode suppressing ability in *B. firmus* has been shown due to the presence of high level protease activity and collagenolytic activity. Thus the determination of the presence of ammonia and of high levels of collagenolytic and protease activities must be confirmed as proof to validate the ability of nematode suppression by *B. firmus*.

1) Determination of Ammonia Producing Ability by *B. firmus* Strain XSB375

To determine ammonia production capabilities of *B. firmus* XSB375, we followed standard methods using Nessler's reagent (Cappuccino and Sherman 1992; Ahmad et al. 2008). This assay was performed using both bacteria grown 72 hours in 10 mL peptone water and a cell-free broth sample of XSB375. The control was done with non-inoculated peptone water. The dark brown yellow colour that develops indicates the amount of ammonia produced and development of a brown colour (forming a brown precipitate when large amounts of ammonia are present) is a positive result. Following these requirements for colour change, our results showed that ammonia is not present in the *B. firmus* XSB375 sample or produced by the bacterial strain.

2) Determination of Collagenolytic Activity of Strain XSB375 in Comparison with Other *Bacillus* Strains To evaluate collagenolytic activity, the methods of Peleg and Feldman (2002) were followed as they claimed collagenolytic activity as a mode of action of *B. firmus* I-1582 in nematode suppression. Peleg and Feldman (2002) presented a range of values demonstrative of nematode suppression and a range of normal physiological background levels and reported a value of 40 enzyme units for *B. firmus* I-1582 and 7.4 enzyme units for *B. cereus* I-1562 for which nematode suppressing properties were also claimed. Therefore, the results obtained in our experiments of extremely low value e.g., 0.47 enzyme units with the XSB375 broth samples and undetected levels with fresh culture (grown 48 hours) have shown significantly lower activity than other *Bacillus* bacteria and other strains of *B. firmus* for which nematode suppressing properties are known (Table 5). Hence the experimental results demonstrate that the *B. firmus* XSB375 does not possess nematode suppressing collagenolytic activities and thereby does not have the ability to control nematodes.

3) Determination of Proteolytic Activity of Strain XSB375 in Comparison with Other *Bacillus* Strains Proteolytic activity was also determined following the assay used by Peleg and Feldman (2002) to provide a reference point for high and low levels of activity. High levels of activity found by Peleg and Feldman (2002), in cultures with $1.8 \times 10^9$ cfu/mL, were O.D. readings of 27.000 for *B. firmus* I-1582 and 15.500 for *B. cereus* I-1562. In our experiments, we obtained O.D. readings, following the same protocol, of 0.042 from a *B. firmus* XSB375 culture (grown 48 hours) with lower cell densities than those of Peleg and Feldman (2002) and 0.272 from the broth samples of the XSB375 which has much higher cell concentration (Table 6). Even after standardising to the same cell concentrations, *B. firmus* XSB375 proteolytic activity measurements are representative of bacterial strains lacking nematicidal activity, but not with those possessing such activities like *B. firmus* I-1582 and *B. cereus* I-1562. Because of the high degree of conservation among nematode targeting proteases, the experimental results on this proteolytic activity shown by *B. firmus* XSB375 provides further evidence that this strain does not have capabilities to suppress/control nematodes.

The above investigations clearly demonstrated negative results for ammonia production, negative results for collagenolytic activity as well as negative results for proteolytic activity in bacterial strain *Bacillus firmus* XSB375. Whereas all of these three were present at high levels in *B. firmus* I-1582 and its formulated products registered for nematode suppression. These are three known mechanisms by which bacteria can exhibit nematode suppression and in fact all three are present in nemacidal *Bacillus* used for nematode suppression. This distinctly differentiates *Bacillus firmus* strain XSB375 and *Bacillus firmus* strain I-1582.

The invention will now be described by way of examples. However, it is to be understood that the examples are for illustrative purposes and the invention is not necessarily limited to the examples.

EXAMPLE 1

Isolation of Phosphate Solubilizing Rhizobacteria

Bacteria were isolated from the canola rhizosphere soil and rhizoplane from Elm Creek, Manitoba by a serial dilution technique and spread plate method. The laboratory basal media used was trypticase soy agar (TSA, 1/10 strength) media and the plates were incubated for 3 days at 28° C. All the rhizobacterial isolates were selected to represent distinct types based on colony morphology that includes colony form, elevation, opacity and pigment production. Rhizobacterial isolates were restreaked on TSA plates, checked for purity and stored on TSA slants at 4° C. Presumptive phosphate solubilizing rhizobacteria were isolated by streaking the isolates on modified PDYA (potato-dextrose yeast extract agar) media plates (de Freitas et al., 1997). The modified media consists of the PDYA media containing freshly precipitated calcium phosphate (i.e. 50 ml sterile 10% (wt/vol) $K_2HPO_4$ and 100 ml sterile 10% (wt/vol) $CaCl_2$) were added per liter of sterile PDYA to produce a precipitate of $CAHPO_4$ (Katznelson and Bose, 1959, *Can J Microbial* 5: 79-85).

Figure 1:
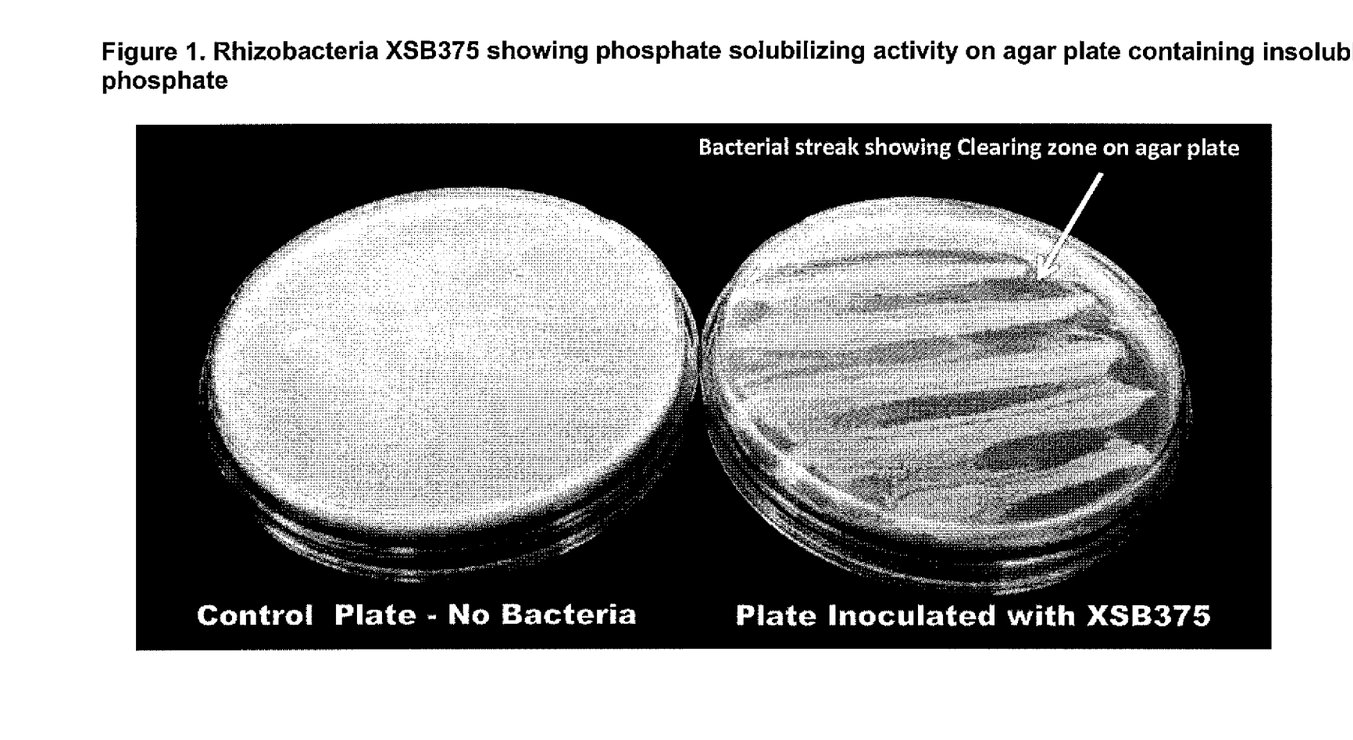
FIG. 1: PGPR strain XSB375 showing clearing zone through phosphate solubilization. Thus, the strain is a phosphate solubilizing rhizobacteria.

Phosphate Solubilization Test:

The ability of the rhizobacterial isolates to solubilize phosphate was assessed qualitatively using modified PDYA media (de Freitas et al., 1997). The modified media consists of the PDYA media containing freshly precipitated calcium phosphate (i.e. 50 ml sterile 10% (wt/vol) $K_2HPO_4$ and 100 ml sterile 10% (wt/vol) $CaCl_2$) were added per liter of sterile PDYA to produce a precipitate of $CAHPO_4$ (Katznelson and Bose, 1959). Each rhizobacterial isolate was streaked on PDYA-CaP plate, TSA-CaP plate, and modified TY (tryptone yeast extract)-CaP plate, and incubated at 28° C. Phosphate solubilizing capacity was assessed up to 14 days by measuring the clearing zone (solubilization area) surrounding the bacterial colony. Among the presumptive phosphate solubilizing rhizobacterial strains isolated from canola rhizosphere and rhizoplane bacterial strain XSB375 produced the earliest and largest zone of clearing on phosphate precipitated plates (FIG. 1).

EXAMPLE 2

Inoculation Effect on Canola Seed Emergence

Figure 2:
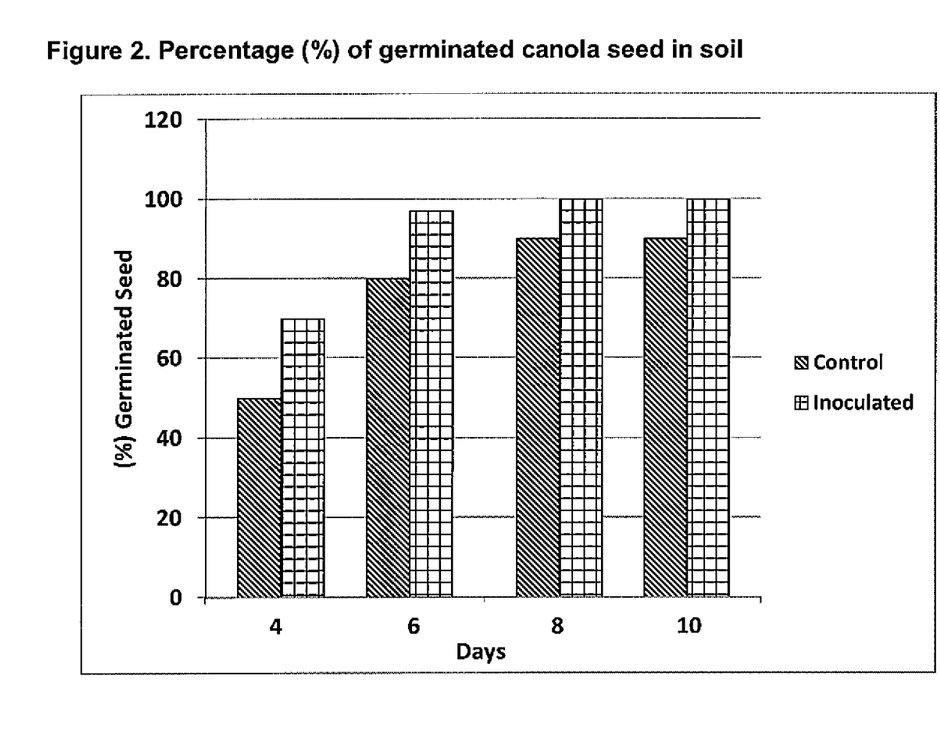
FIG. 2: Canola seed emergence in soil was depicted after canola seeds inoculated with PGPR strain XSB375 compared to control up to 10 days. The bacterial strain enhanced the canola seed emergence in comparison to uninoculated control.
Figure 3:
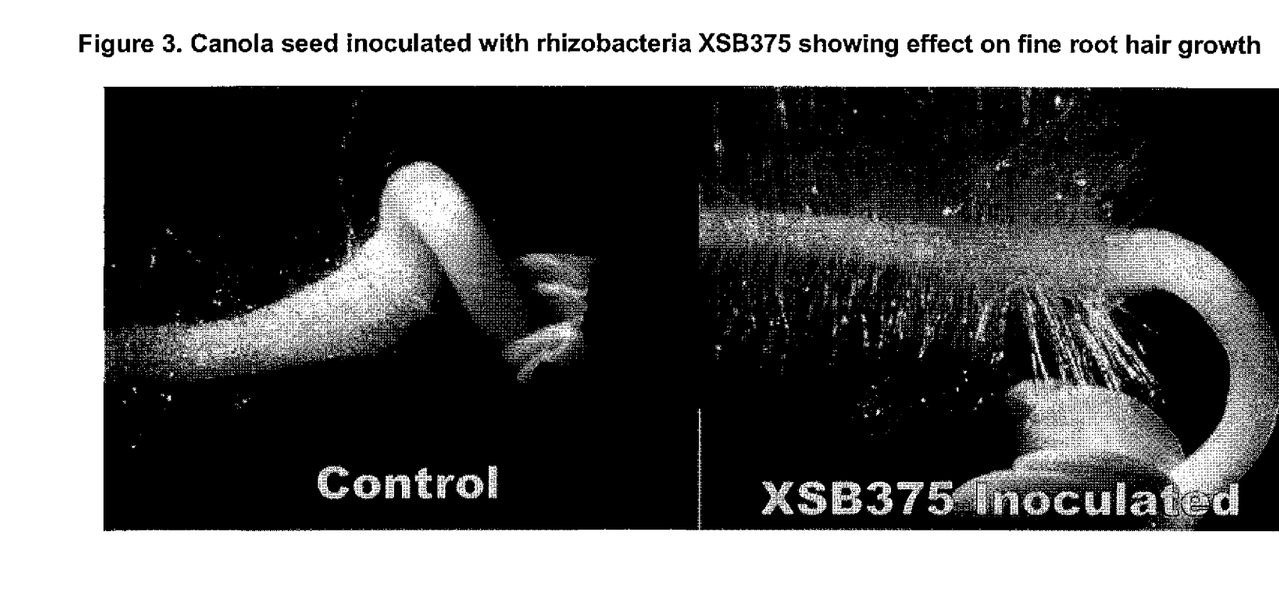
FIG. 3: Growth of canola fine root hairs was depicted after canola seeds inoculated with PGPR strains XSB375 compared to control at 3 days. The strain enhanced the root growth in comparison to control.

Bacterial strain XSB375 was grown in 100 ml of TY broth for 48 hours on a rotary shaker. Bacterial cell culture was concentrated by centrifugation and washed with distilled water and suspended in NaCl solution. Surface disinfected canola seeds were then inoculated with the bacterial suspension. Inoculated seeds were placed on agar plates to observe the bacterial effect on canola seed emergence (Table 1). A set of uninoculated seeds were also placed on agar plates as control. Inoculated seeds were also planted on soil pots and growth pouches to examine bacterial effect in soil (FIG. 2) and growth pouch (Table 2). Results illustrated that canola seeds inoculated with strain XSB375 enhanced seed emergence on agar plate, in soil and in growth pouch compared to control (Table 1 and 2, FIGS. 2 and 3).

EXAMPLE 3

Inoculation Effect on Canola Growth Promotion in Growth Pouch

Figure 4:
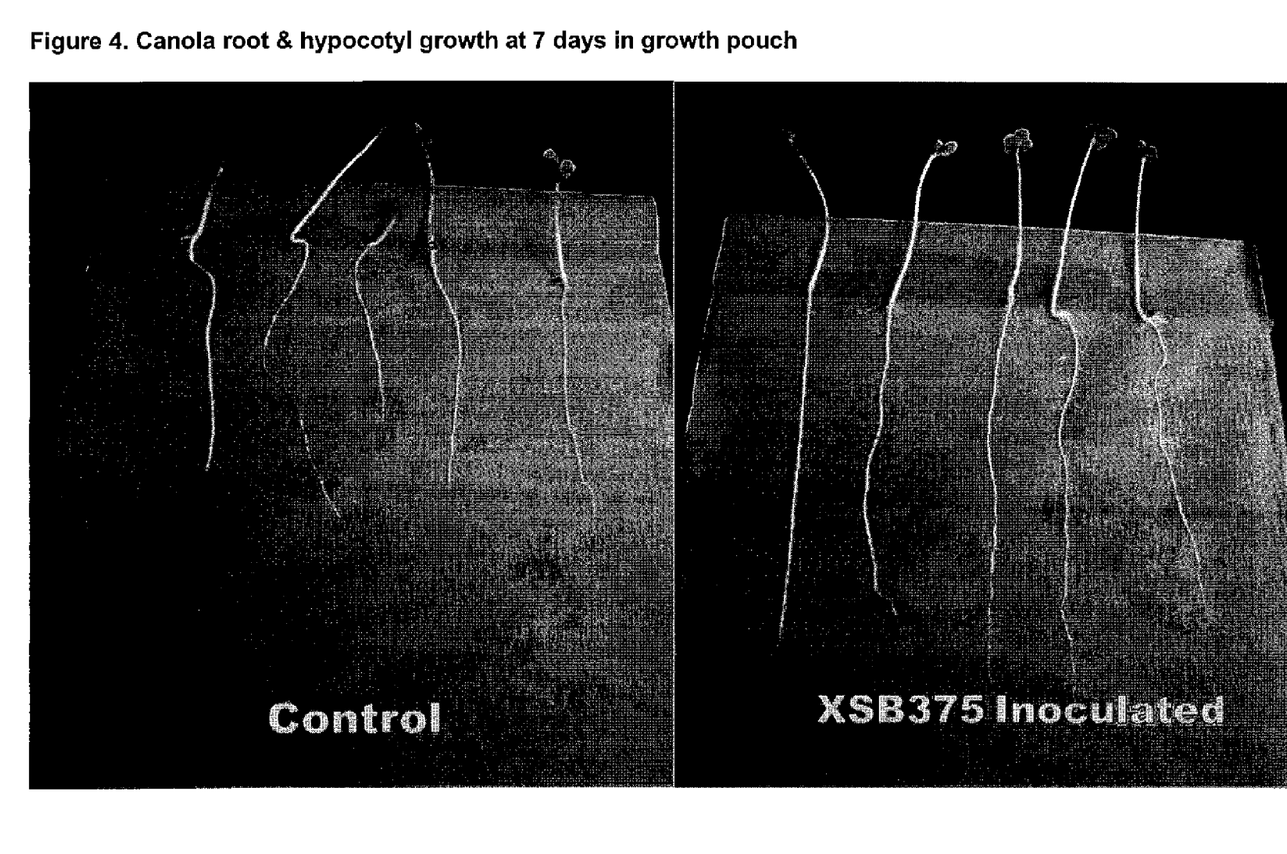
FIG. 4: Canola root and hypocotyl growth at 7 days was depicted for seeds inoculated with PGPR strain XSB375 compared to control in growth pouch. The root and hypocotyls growth considerably enhanced due to the inoculation of strain XSB375 in comparison to control.
Figure 5:
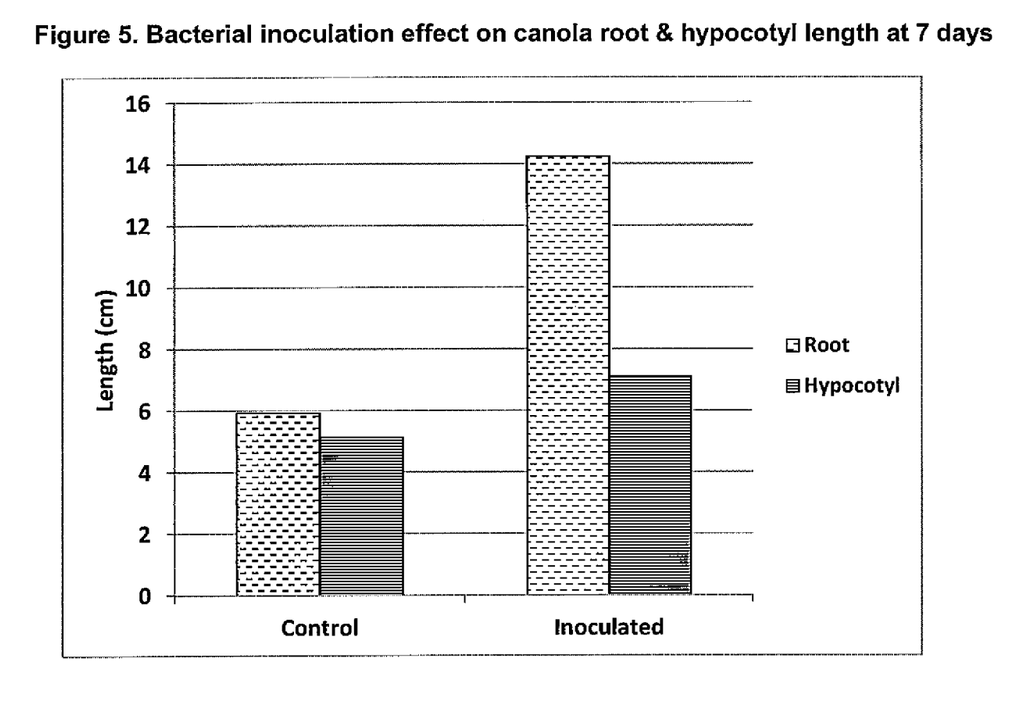
FIG. 5: Canola root and hypocotyl growth at 7 days was measured for seeds inoculated with PGPR strain XSB375 compared to control in growth pouch. The root and hypocotyls growth considerably enhanced due to the inoculation of strain XSB375 in comparison to control.

Surface disinfected canola seeds were inoculated with the bacterial suspension. Inoculated seeds were planted in growth pouches to examine the bacterial effect on canola growth promotion (FIG. 4). A set of uninoculated seeds were also placed in growth pouch as control. Plant hypocotyl and root lengths were measured after 7 days (FIG. 5). Results illustrated that canola seeds inoculated with strain XSB375 enhanced canola growth promotion in growth pouch compared to control (FIGS. 4 and 5). The bacterial strain XSB375 enhanced the canola root (mean length 14.26 cm) and hypocotyl (mean length 7.11 cm) growth considerably in comparison to control root (5.94 cm) and control hypocotyl (mean length 5.14 cm).

EXAMPLE 4

Viability of Bacteria on Seed, in Peat Powder and in Liquid Suspension

The benefit of microbial inoculation for greater crop production is significantly impacted by the number of live cells introduced into soil (Duquenne et al., 1999). Furthermore, biological activity of microbes may also decline rapidly with handling and storage procedure. It is important to evaluate the duration of bacterial viability in seed treatment or in the carrier materials to obtain the desired level of microbial population for the inoculant to be effective. Seed inoculated with strain XSB375 retained viable cell count well above desired level to 21 days after inoculation (Table 3). Seed coating generally increase the bacterial viability as coating prevents cells from drying out and keeps bacteria live much longer period.

Figure 6:
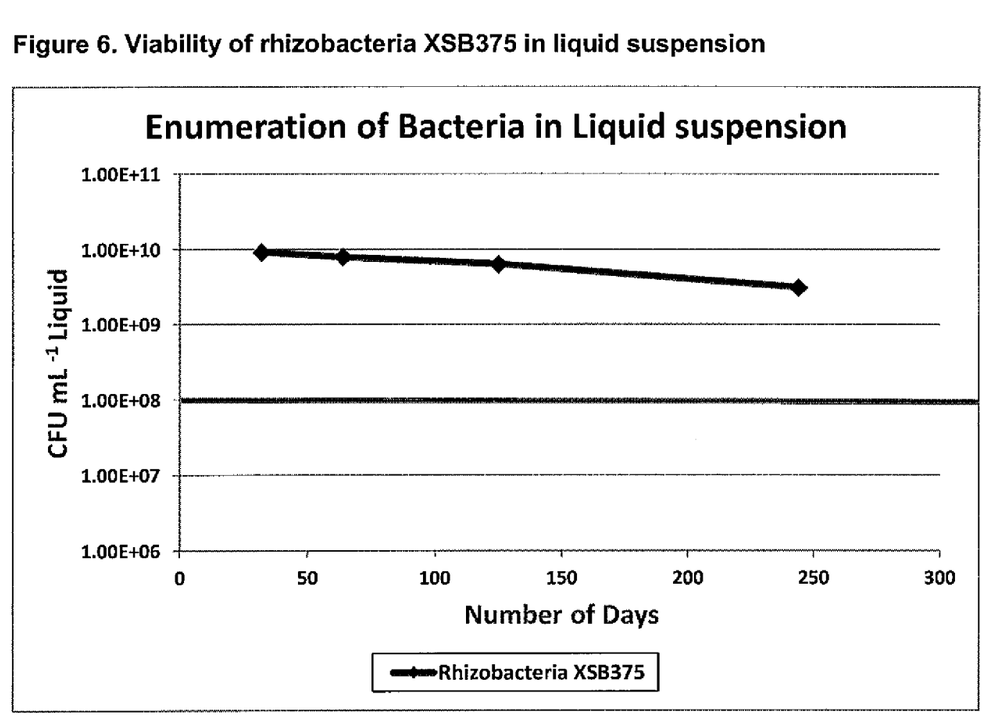
FIG. 6: Viability of PGPR strain XSB375 in liquid suspension. The number of bacterial count showed that it is well over $1 \times 10^9$ cfu/ml at 244 days. Thus, bacterial survivability in the liquid suspension would be over 244 days.

The strain XSB375 was tested for the viability and shelf life with different inoculant carrier materials such as liquid media, peat powder, etc. The bacterial strain XSB375 was grown in modified TY broth for 48 hours and mixed with specifically formulated liquid media used as liquid carrier. The bacteria grown in TY broth was also used directly to inoculate commercially available sterilized peat powder. Bacterial viability was tested periodically for both liquid suspension and peat powder. It is shown that when sterile peat bags were inoculated with the rhizobacterial strain XSB375 survivability of the strain were increased up to 244 days at over $10^9$ cfu per gram of carrier material (Table 4). Moreover, when bacteria XSB375 was inoculated and kept in liquid suspension in a sterile bag and analysis showed that bacterial strain XSB375 remained viable over 240 days and viable bacterial count was greater than $1 \times 10^9$ cfu/ml (FIG. 6). Both the liquid and peat formulation were found to be effective carrier materials for PGPR strain XSB375 to maintain desired product shelf life.

EXAMPLE 5

Effect of PGPR Inoculation on Canola Yield in Field Trials

Figure 7:
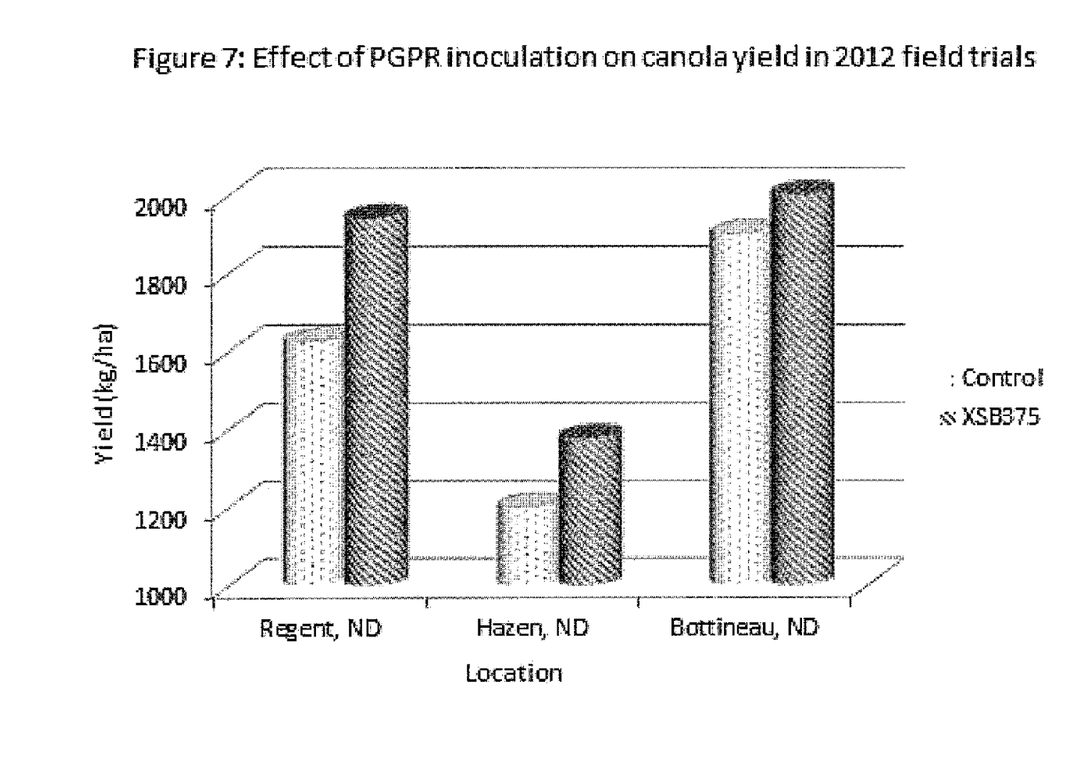
FIG. 7: Canola yields in Regent, ND; Hazen, ND; and Bottineau, ND field trial sites in year 2012. The PGPR XSB375 treatment increased canola yield by 19.4% compared to the control in Regent, ND site. The PGPR XSB375 treatment increased canola yield by 14.6% compared to the control in Hazen, ND site. The PGPR XSB375 treatment increased canola yield by 6.6% compared to the control in Bottineau, ND site. Thus, the PGPR treatment XSB375 on an average increased canola yield by 13.5% compared to the uninoculated control.

In 2012, three field trials were carried out using PGPR strain XSB375. The canola trials were planted through commercial seed planter and foliar bacterial treatment was applied during first post emergent herbicide application using tank mix. Herbicide tolerant canola cultivar was used and all field trials were split strip design, each strip was size of 10 acres, with one bacterial treatment along with one control, replicated three to four times. The treatments were designed to evaluate bacterial ability to enhance canola yield. Strips were harvested at maturity, seed was collected and cleaned, and yield was measured based on 8.5% seed moisture. Canola yield data in Regent, ND; Hazen, ND; and Bottineau, ND; sites were presented in FIG. 7. FIG. 7 showed that the PGPR strain XSB375 treatment increased canola yield by 19.4% compared to the control in Regent, ND; 14.6% compared to the control in Hazen, ND; and 6.6% compared the control in Bottineau, ND; whereas, the PGPR XSB375 treatment on an average increased canola yield by 13.5% compared to the uninoculated control across all the sites in North Dakota.

EXAMPLE 6

Identification of Rhizobacterial Strain

The bacterial strain XSB375 was grown on modified TY media for 48 hours. Then the bacterial DNA was extracted from the bacteria for 16S DNA and 500 bp (base pair) identification using the services of MIDI LABS (Newark, Del.). The strain was identified as *Bacillus firmus* XSB375.

EXAMPLE 7

Commercial Exploitation

As discussed herein, rhizospheric bacteria, along with other bacteria and microbes, inhabit the zones of soil-plant interface where they fiercely complete for substrates, such as root exudates and slough-off root tissues, and space for growth in the rhizosphere region.

While some of these naturally-occurring microbes may have traits beneficial for crop growth, the presence of a particular bacterial population in an unmodified or unsupplemented rhizosphere is largely dependent on what substrates are available, current environmental constraints on bacterial growth, for example, soil moisture, soil pH, presence of organic matter, and the like, and competition between the various microbial populations.

For example, certain types of beneficial bacteria may not exist in a particular field soil, or may be present in other field soil but at an extremely low population and/or low vigor and thus fail to exhibit any beneficial effect on plants grown in an unmodified or unsupplemented rhizosphere, irrespective of carrying an inherent beneficial trait.

That is, in order for a bacterial strain carrying an inherent beneficial trait, such as a PGPR, to have a positive impact on plant growth, that bacterial strain must have a competitive advantage to be effective and strong colonizer within the rhizosphere regions during active plant growth. That is, the bacterial strain must be capable of competitive colonization.

As will be apparent to one of skill in the art, under unmodified or unsupplemented conditions, it is very unlikely that any native or naturally occurring PGPR will have any beneficial impact on plant growth. This is also true of bacterial strain XSB375.

As discussed herein, PGPR strain XSB375 has been isolated from canola rhizosphere and has been demonstrated to have a plant growth-beneficial P-solubilizing trait. As discussed herein, XSB375 is produced in a laboratory environment under specific growth conditions demonstrated to maximize XSB375's PGPR properties, growth and population density. Laboratory grown XSB375 strain, when applied to the rhizospheric region, have been shown to be more competitive and therefore have a beneficial impact on plant growth which is otherwise not possible. That is, growth conditions have been determined which optimize XSB375's ability to competitively colonize the rhizosphere of growing plants.

As discussed herein, a biologically pure culture of XSB375 was grown to prepare a stock culture. Aliquots of this stock culture were preserved in cryogenic vials in a $-86°$ C. ultra-low freezer.

For production runs, frozen stock culture was used to inoculate a flask containing growth media and under specific conditions.

In some embodiments, the growth media was a tryptone-yeast extract nutrient broth.

In some embodiments, the bacterial culture is grown at a temperature of between 24-32° C. In other embodiments, the bacterial culture is grown at a temperature of between 26-30° C. or approximately 28° C.

In some embodiments, the pH of the growth media is between 6-8. In other embodiments, the pH of the media is between 6.7-7.9. In some embodiments, the pH is between 7.0-7.6 or not substantially different than 7.2-7.4.

The flask culture was then scaled-up in a fermentor under the same or similar growth conditions. As discussed herein, these conditions promoted higher population growth, that is, a higher number of colony forming units per ml (higher population growth) and maximized the plant growth-promoting properties of XSB375 as the culture entered early stationary phase.

Aliquots from the early stationary phase culture were packaged in irradiated sterile plastic bags. The concentration of the active ingredient in the final product is a minimum of $1 \times 10^8$ cfu per mL. As discussed above, the fermented culture of strain XSB375 was grown under optimum nutrient and pH conditions such that optimum bacterial viability, that is, optimum population retention, and plant growth promoting properties have been achieved. The liquid formulation from the sterile bags can be applied to any suitable plant for which increased phosphate solubilisation is desired. For example, when the liquid formulation was applied to young seedlings, XSB375, because of the population density, was able to quickly establish a competitive population advantage within the rhizosphere and as a result was able to express its positive plant growth traits and thereby produce a beneficial impact on the plant which otherwise would not have been possible, that is, which would not have occurred if only the naturally occurring bacteria was present in the rhizosphere of the plant. Specifically, the liquid formulation can be applied as a liquid to plants post emergence, that is, seedlings, or post seed planting or prior to seed planting.

In other embodiments, the fermented culture of strain XSB375 was spun down in a centrifuge and aspirated dry. The dried cell mass was then freeze-dried to produce a dry powder which was then packaged in sterile plastic tubes. The concentration of the active ingredient in the final product is a minimum of $1 \times 10^7$ cfu per g dry powder. The dry powder can be applied in a variety of means, for example, directly to soil prior to planting, simultaneously with planting of seeds in soil or as a coating to seeds or agronomically compatible carriers which are then planted in the soil.

As discussed herein, growth conditions have been developed which maximize the population density of XSB375 in early stationary phase. These growth conditions also maximize the plant growth promoting traits of the bacteria, as discussed herein. As such, the early stationary phase formulations described herein can be applied to seed or seedlings and XSB375, by virtue of the optimized growth conditions, is able to out-compete naturally occurring micro-organisms inhabiting the rhizosphere and establish competitive colonisation. As a result, XSB375 is then able to exert its plant growth promoting traits, including phosphate solubilisation on the plants growing in the rhizosphere. As discussed herein, this would not be possible if XSB375 had not been first grown to early stationary phase under optimizing conditions. Specifically, without these advantages, XSB375 would not have been able to colonize the rhizosphere to a sufficient extent to exert beneficial properties on plant growth.

The early stationary phase liquid formulation having a minimum of $1\times10^8$ cfu per mL and the dry powder formulation having a minimum of $1\times10^7$ cfu per g dry powder have been demonstrated to increase crop yield in a variety of plants, including but by no means limited to canola, corn, wheat, barley and legumes.

The scope of the claims should not be limited by the preferred embodiments set forth in the examples, but should be given the broadest interpretation consistent with the description as a whole.

REFERENCES

Ahmad F, Ahmad I, Khan M S. 2008. Screening of free-living rhizospheric bacteria for their multiple plant growth promoting activities. Microbiological Research. 163: 173-181.

EFSA (European Food Safety Authority). 2012. Final addendum to the Draft Assessment Report (DAR): Public Version. European Food Safety Authority, June 2012. 440 pp.

Geng C, Nie X, Tang Z, Zhang Y, Lin J, Sun M, Peng D. 2016. A novel serine protease, Sep1, from *Bacillus firmus* DS-1 has nematicidal activity and degrades multiple intestinal-associated nematode proteins. Scientific Reports. 6: 25012.

Holt J G, Castenholz R W, Schleifer K-H, Tully J G, Ursing J, Williams S T. 1994. Bergey's Manual of Determinative Bacteriology 9th ed. The Williams and Wilkins Co., Baltimore, USA.

Keren-Zur M, Antonov J, Bercovitz A, Feldman K, Husid A, Kenan G, Marcov N, Rebhun M. 2000. *Bacillus firmus* formulations for the safe control of root-knot nematodes. Proceedings of the Brighton Crop Protection Conference on Pests and Diseases. 2A: 47-52.

Lamovšek J, Urek G, Trdan S. 2013. Biological control of root-knot (*Meloidogyne* spp.): Microbes against the pests. Acta Agriculturae Slovenica. 101: 263-275.

Logan N A, De Vos P. 2009. *Bacillus*. In Bergey's Manual of Systematic Bacteriology, 2nd edition Volume 3. ed.: De Vos P, Garrity G M, Jones D, Krieg N R, Ludwig W, Rainey F R, Schleifer K H, and Whitman W B. pp 21-128. Springer, New York, USA.

Niu Q, Huang X, Tian B, Yang J, Liu J, Zhang L, Zhang K. 2006. *Bacillus* sp. B16 kills nematodes with a serine protease identified as a pathogenic factor. Applied Microbiology and Biotechnology. 69: 722-730.

Niu Q, Huang X, Zhang L, Lian L, Li Y, Li J, Yang J, Zhang K. 2007. Functional identification of the gene bace16 from nematophagous bacterium *Bacillus* nematocida. Applied Microbiology and Biotechnology. 75: 141-148.

Niu Q, Tian Y, Zhang L, Xu X, Niu X, Xia Z, Lei L, Zhang K Q, Huang X. 2011. Overexpression of the key virulence proteases Bace16 and Bae16 in *Bacillus* nematocida B16 to improve its nematicidal activity. Journal of Molecular Microbiology and Biotechnology. 21: 130-137.

Peleg I, Feldman K. 2002. *Bacillus firmus* CNCM I-1582 or *Bacillus cereus* CNCM I-1562 for controlling nematodes. U.S. Pat. No. 6,406,690 B1. 7 pp.

Peng D, Lin J, Huang Q, Zheng W, Liu G, Zheng J, Zhu L, Sun M. 2016. A novel metalloproteinase virulence factor is involved in *Bacillus thuringiensis* pathogenesis in nematodes and insects. Environmental Microbiology. 18: 846-862.

Rodriguez-Kábana R. 1986. Organic and inorganic nitrogen amendments to soil as nematode suppressants. Journal of Nematology. 18: 129-135.

Schrimsher D W, Lawrence K S, Castillo J, Moore S R, Kloepper J W. 2011. Effects of *Bacillus firmus* GB-126 on the soybean cyst nematode mobility in vitro. Phytopathology. 101: 5161.

Terefe M, Tefera T, Sakhuja P K. 2009. Effect of a formulation of *Bacillus firmus* on root-know *Meloidogyne incognita* infestation and the growth of tomato plants in the greenhouse and nursery. Journal of Invertebrate Pathology. 100: 94-99.

Tian B, Li N, Lian L, Liu J, Yang J, Zhang K. 2006. Cloning, expression and deletion of the cuticle-degrading protease BLG4 from nematophagous bacterium *Brevibacillus laterosporus* G4. Archives of Microbiology. 186: 297-305.

Tian B, Yang J, Lian L, Wang C, Li N, Zhang K-Q. 2007a. Role of an extracellular neutral protease in infection against nematodes by *Brevibacillus laterosporus* strain G4. Applied Microbiology and Biotechnology. 74: 372-380.

Tian B, Yang J, Zhang K. 2007b. Bacteria used in the biological control of plant-parasitic nematodes: populations: mechanisms of action, and future prospects. FEMS Microbiology Ecology. 61: 197-213.

Wilson M J. Jackson T A. 2013. Progress in the commercialisation of bionematicides. BioControl. 58: 715-722.

Zhang Z, Schwartz S, Wagner L, Miller W. 2000. A greedy algorithm for aligning DNA sequences. Journal of Computational Biology. 7: 203-214.

TABLE 1

Effect of bacterial inoculation on canola seed emergence on agar plate

| Treatment | Percent (%) Emergence | | | |
|---|---|---|---|---|
| | 2-Day | 4-Day | 6-Day | 8-Day |
| Control | 60 | 99 | 99 | 99 |
| Inoculated Seed | 80 | 100 | 100 | 100 |

TABLE 2

Effect of bacterial inoculation on canola seed emergence in growth pouch

| Treatment | Percent (%) Emergence | | | |
|---|---|---|---|---|
| | 2-Day | 4-Day | 6-Day | 8-Day |
| Control | 60 | 94 | 99 | 99 |
| Inoculated Seed | 80 | 100 | 100 | 100 |

TABLE 3

Viability of rhizobacteria XSB375 in inoculated canola seed

| Treatment | CFU × 10⁵ per Seed | | | |
| --- | --- | --- | --- | --- |
| | 4-Day | 7-Day | 14-Day | 21-Day |
| Control | 0 | 0 | 0 | 0 |
| Inoculated Seed | 63 | 42 | 34 | 12 |

TABLE 4

Viability of rhizobacteria XSB375 in inoculated peat powder

| Bacterial Strain | Incubation Period (Day) | CFU/g of Peat carrier materials |
| --- | --- | --- |
| XSB375 | 32 | >10$^9$ |
| | 64 | >10$^9$ |
| | 125 | >10$^9$ |
| | 244 | >10$^9$ |

TABLE 5

Collagenolytic activity of bacterial isolates.

| Bacteria | Control O.D. | Sample O.D. | CFU/100 μL | Enzyme Units |
| --- | --- | --- | --- | --- |
| B. firmus I-1582[1] | 0.000 | 0.40 | 6.1 × 10$^5$ | 40.00 |
| B. cereus I-1562[1] | 0.000 | 0.37 | 3 × 10$^6$ | 7.40 |
| Bacillus 203[1] | 0.000 | 0.34 | 1.3 × 10$^7$ | 1.56 |
| Bacillus 122[1] | 0.000 | 0.78 | 3.5 × 10$^5$ | 134.00 |
| B. firmus XSB375 | 0.000 | No Change | 9.5 × 10$^5$ | Not Present |
| XSB Broth Sample[2] | 0.000 | 0.074 | 1 × 10$^7$ | 0.47 |

[1]Data source: Peleg I, Feldman K. 2002. U.S. Pat. No. U.S. 6,406,690 B1.
[2]Product supernatant used in assay.

TABLE 6

Proteolytic activity of bacterial isolates.

| Bacteria | Sample O.D. | CFU/1 mL |
| --- | --- | --- |
| B. firmus I-1582[1] | 27.000 | 1.8 × 10$^9$ |
| B. cereus I-1562[1] | 15.500 | 1.8 × 10$^9$ |
| Bacillus 203[1] | 0.118 | 1.8 × 10$^9$ |
| Bacillus 122[1] | 2.59 | 1.8 × 10$^9$ |
| B. firmus XSB375 | 0.042 | 9.5 × 10$^5$ |
| XSB Broth Sample[2] | 0.272 | 1 × 10$^8$ |

[1]Data source: Peleg I, Feldman K. 2002. U. S. Pat. No. U.S. 6,406,690 B1.
[2]Product supernatant used in assay.

The invention claimed is:

1. A method for promoting or increasing or improving plant growth and/or plant yield comprising:
preparing a composition comprising a high density aliquot of plant growth promoting (PGPR) XSB375 *Bacillus firmus* strain deposited as ATCC#PTA-120309;
applying said composition to a soil environment in which seeds or seedlings have been or will be planted;
growing said seeds or seedlings into plants in said soil environment, said PGPR XSB375 colonizing said soil environment and secreting phosphatase activity in an amount sufficient to increase solubilisation of phosphate in the soil environment to $HPO_4^{2-}$ and $H_2PO_4^-$ for uptake by the plants such that growth of said plants is increased or improved; and
harvesting said plants.

2. The method according to claim 1 wherein the high density aliquot comprises at least about 1×10$^7$ colony forming units per ml of PGPR XSB375.

3. The method according to claim 1 wherein the biologically pure culture is grown to a high density in a fermentor in growth media that increases or enhances the plant growth promoting properties of PGPR XSB375.

4. The method according to claim 3 wherein the growth media is a tryptone-yeast extract nutrient broth.

5. The method according to claim 4 wherein the tryptone-yeast extract has a pH of between 6.7-7.9.

6. The method according to claim 1 wherein the aliquot is prepared by growing a biologically pure culture of PGPR XSB375 *Bacillus firmus* strain deposited as ATCC#PTA-120309 is grown in a fermentor containing a tryptone-yeast extract nutrient broth with a pH between 6.7-7.9 to a density of at least about 1×10$^7$ colony forming units per ml in early stationary phase and aliquoting the culture.

7. The method according to claim 6 wherein the culture is aliquoted as liquid aliquots wherein each liquid aliquot has a density of at least about 1×10$^8$ colony forming units per ml.

8. The method according to claim 6 wherein the culture is aliquoted by pelleting the culture to produce a cell mass, drying the cell mass, freeze drying the dried cell mass to a powder and aliquoting the powder, wherein the powder has a density of at least about 1×10$^7$ colony forming units per gram.

9. The method according to claim 1 wherein the soil environment or potting mixture includes phosphorus as a fertilizer.

10. The method according to claim 1 wherein the PGPR XSB375 promotes uptake of macronutrients or micronutrients in the plant.

11. The method according to claim 1 wherein the plant has a nutrient phosphorus requirement or the plant would benefit from increased phosphate uptake.

12. The method according to claim 1 wherein the plant is canola.

13. The method according to claim 1 wherein the plant is an oil seed, legume, non-legume, cereal, root plant, vegetable, grass, forage, turf, fruits and flowering plant.

14. The method according to claim 1 wherein the plant is selected from the group consisting of canola, soybean, sunflower, flax, hemp, wheat, barley, corn, millet, oat, pea, lentil, beans, peanut, alfalfa, clover, sugar beets, potatoes, carrots, cabbages, tomatoes, radishes, capsicum, cucumber, grasses, turf, cantaloupe, melon, fruits and flowers.

15. The method according to claim 14 wherein the flowers are selected from the group consisting of rose, chrysanthemum, lily and gerbera.

16. The method according to claim 1 further including applying to said soil environment a herbicide or fungicide or insecticide or seed treatment chemical.

17. The method according to claim 1 wherein the PGPR XSB375 is applied as consortia with another microorganism.

18. The method according to claim 1 wherein the PGPR XSB375 is applied in combination with other plant growth promoting rhizobacteria.

* * * * *